(12) United States Patent
Hashimoto et al.

(10) Patent No.: US 7,034,274 B2
(45) Date of Patent: Apr. 25, 2006

(54) LIGHT RECEIVING DEVICE WITH CONTROLLABLE SENSITIVITY AND SPATIAL INFORMATION DETECTING APPARATUS USING THE SAME

(75) Inventors: Yusuke Hashimoto, Neyagawa (JP); Yuji Takada, Kyoto (JP); Fumikazu Kurihara, Nara (JP)

(73) Assignee: Matsushita Electric Works, Ltd., Kodoma (JP)

(*) Notice: Subject to any disclaimer, the term of this patent is extended or adjusted under 35 U.S.C. 154(b) by 120 days.

(21) Appl. No.: 10/455,431

(22) Filed: Jun. 6, 2003

(65) Prior Publication Data

US 2004/0195493 A1 Oct. 7, 2004

(30) Foreign Application Priority Data

Apr. 7, 2003 (JP) .............................. 2003-103245

(51) Int. Cl.
*H01L 27/14* (2006.01)
(52) U.S. Cl. .............................. 250/208.1; 250/214.1; 257/222; 257/448
(58) Field of Classification Search ............. 250/208.1, 250/214.1, 221; 257/222, 255, 229, 290–292, 257/443, 448; 348/294, 304, 311, 317
See application file for complete search history.

(56) References Cited

U.S. PATENT DOCUMENTS

| 4,961,096 A | 10/1990 | Idesawa |
| 5,514,887 A * | 5/1996 | Hokari ........................ 257/222 |
| 5,856,667 A | 1/1999 | Spirig et al. |
| 6,087,703 A | 7/2000 | Ohta et al. |

FOREIGN PATENT DOCUMENTS

| DE | 197 04 496 | 3/1998 |
| EP | 1 243 944 | 9/2002 |
| WO | WO 03/085413 | 10/2003 |

OTHER PUBLICATIONS

S. M. Sze, "Physics of Semicondcutor Devices Second Edition", Central Book Company, 1981.

* cited by examiner

*Primary Examiner*—Kevin Pyo
(74) *Attorney, Agent, or Firm*—Oblon, Spivak, McClelland, Maier & Neustadt, P.C.

(57) ABSTRACT

A light receiving device using a new method of controlling sensitivity and a spatial information detecting apparatus using the same technical concept are provided. This light receiving device comprises a photoelectric converter for receiving a light at a light receiving surface and generating amounts of electric charges corresponding to an intensity of received light; electrodes formed on the photoelectric converter; a charge collection area induced in the photoelectric converter by applying a control voltage to the electrodes to collect at least part of the electric charges generated in the photoelectric converter; a charge ejector for outputting the electric charges from the charge collection area; and a sensitivity controller for controlling the number of the electrodes, to which the control voltage is applied, to change size of the charge collection area in the light receiving surface of the photoelectric converter. As compared with conventional ones, this light receiving device is of a relatively simple structure with an increased aperture ratio and excellent in S/N ratio.

17 Claims, 7 Drawing Sheets

LIGHT RECEIVING DEVICE WITH CONTROLLABLE SENSITIVITY AND SPATIAL INFORMATION DETECTING APPARATUS USING THE SAME

BACKGROUND OF THE INVENTION

1. Field of the Invention

The present invention relates to a light receiving device using a new sensitivity control method and a spatial information detecting apparatus using intensity-modulated light according to the technical concept of the same light receiving device.

2. Disclosure of the Prior Art

In the past, to control the sensitivity of a light receiving device, it has been known to place an optical member adjacent to the light receiving device. This optical member has the capability of adjusting a light amount supplied to the light receiving device according to an external signal. In addition, it has been already introduced to adjust a ratio of amounts of electric charges output as signal charges from the light receiving device to the amounts of electric charges generated in the light receiving device according to an intensity of received light in order to control the sensitivity of the light receiving device.

The technique of controlling the sensitivity of the light receiving device can be used for an apparatus for detecting spatial information. For example, an intensity-modulated light is irradiated from a light source into the space, and a reflection light reflected from an object in the space is received by the light receiving device. According to a relationship between the intensity-modulated light and the received light, the spatial information can be determined. In the present specification, the spatial information includes a distance between the apparatus and the object in the space, a change in an amount of received light caused by reflections on the object in the space, and so on. For example, the distance between the apparatus and the object can be determined from a phase difference between the intensity-modulated light and the received light. In general, this technique is called the time-of-flight method.

U.S. Pat. No. 5,856,667 discloses an apparatus using this time-of-flight method. In this apparatus, the light emitted from the light source is intensity-modulated by a sine wave having a required modulation frequency (i.e., emission frequency), and a light sensitive part detects the intensity of received light plural times within a time period shorter than a modulation period that is the reciprocal of the modulation frequency. For example, the intensity of received light is detected by the light sensitive part at a certain phase of the modulated light. For example, the intensity of received light can be detected 4 times within one modulation period, and the phase difference is determined from the detected four intensities of received light.

When detecting the intensity of received light at the specific phase within the modulation period, it is needed to control the sensitivity of the light receiving device. In the apparatus disclosed in U.S. Pat. No. 5,856,667, a switch area is formed between the light sensitive part for producing a number of electric charges when receiving the light and a memory area for storing the generated electric charges, and required amounts of the electric charges are transferred from the light sensitive part to the memory area through the switch area. However, since the switch area and the memory area are formed independently from the light sensitive part, there is a problem that the apparatus becomes a complex structure as a whole. In addition, since light shielding is needed for the switch area and the memory area, there is another problem that the light shielding area relatively increases to reduce an aperture ratio, so that the sensitivity lowers.

SUMMARY OF THE INVENTION

Therefore, a primary object of the present invention is to provide a light receiving device with controllable sensitivity, which is of a relatively simple structure with an increased aperture ratio and excellent in S/N ratio.

That is, the light receiving device of the present invention comprises:

a photoelectric converter for receiving a light at a light receiving surface and generating amounts of electric charges corresponding to an intensity of received light;

at least one electrode formed on the photoelectric converter;

a charge collection area induced in the photoelectric converter by applying a control voltage to the at least one electrode to collect at least part of the electric charges generated in the photoelectric converter;

a charge ejector for outputting the electric charges from the charge collection area; and a sensitivity controller for controlling the control voltage applied to the at least one electrode to change size of the charge collection area in the light receiving surface of the photoelectric converter.

According to the present invention, since the size of the charge collection area can be adjusted by controlling the voltage applied to the at least one electrode, it is possible to provide the light receiving device with a refined structure, as compared with the conventional light receiving device having the switch area and the memory area formed independently from the light sensitive part. In addition, since the functions of controlling the sensitivity and collecting the electric charges can be achieved without light shielding, it is possible to provide the light receiving device having a relatively large light receiving area, an increased aperture ratio, and a high S/N ratio.

As a preferred embodiment of the above light receiving device, the at least one electrode are a plurality of electrodes, and the sensitivity controller controls the number of the electrodes, to which the control voltage is applied, to change the size of the charge collection area.

Another object of the present invention is to provide a spatial information detecting apparatus using intensity-modulated light according to the technical concept of the light receiving device described above. That is, this spatial information detecting apparatus comprises:

a photoelectric converter having a light receiving surface for receiving a light provided from a space, into which a light intensity-modulated at a modulation frequency is being irradiated, and generating amounts of electric charges corresponding to an intensity of received light;

at least one electrode formed on the photoelectric converter;

a charge collection area, which is induced in the photoelectric converter when a control voltage is applied to the at least one electrodes, for collecting at least part of the electric charges generated in the photoelectric converter;

a charge ejector for outputting the electric charges from the charge collection area;

a control circuit for controlling the control voltage applied to the electrodes to change size of the charge collection area in the light receiving surface of the photoelectric converter with passage of time; and an analyzer for determining spatial information from an output of the charge ejector.

It is preferred that the control circuit controls the control voltage at a timing synchronized with a period of the modulation frequency. In this case, the spatial information can be determined according to a relationship between a predetermined modulation signal and the received light.

It is preferred that control circuit controls the control voltage at a local oscillator frequency different from the modulation frequency, and the charge ejector outputs the electric charges from the charge collection area in synchronization with a beat signal having a frequency difference between the modulation frequency and the local oscillator frequency. In this case, the spatial information can be determined by use of the beat signal having a frequency lower than the modulation frequency.

As a further preferred embodiment of the present invention, the spatial information detecting apparatus described above has a plurality of photoelectric converters, and at least one electrode is formed on each of the photoelectric converters. In addition, the control circuit applies control voltages having different phases from each other, which are synchronized with a period of the modulation frequency, to the electrodes on the photoelectric converters. The charge ejector outputs, in a batch manner, the electric charges corresponding to the different phases from charge collection area induced in the photoelectric converters.

In this case, since the electric charges corresponding to the different phases are separately generated in the photoelectric converters, so that the charge collection area of each of the photoelectric converters collects the electric charges corresponding to each of the difference phases, it is not needed to output the electric charges from the charge collection area individually with respect to each of the different phases. That is, after a required number of the signal charges corresponding to the different phases are obtained in the charge collection areas, they can be output in a batch manner. Therefore, as compared with the case of using only one photoelectric converter to collect the signal charges corresponding to the different phases, it is possible to efficiently determine the spatial information.

As another preferred embodiment of the present invention, the spatial information detecting apparatus described above has a plurality of photoelectric converters, and at least one electrode is formed on each of the photoelectric converters. In addition, the control circuit applies control voltages having different phases from each other, which have a local oscillator frequency different from the modulation frequency, to the electrodes on the photoelectric converters. The charge ejector outputs, in a batch manner, the electric charges corresponding to the different phases from charge collection area induced in the photoelectric converters.

In this case, since the signal charges corresponding to a plurality of phases of the beat signal are obtained within a relatively short time period, it is possible to determine the spatial information at an improved response speed. In addition, the signal charges extracted in synchronization with the beat signal are substantially equal to an integration of the signal charges over plural periods of the modulation frequency. Therefore, even when a distortion occurs in the waveform of the light received by the photoelectric converter due to a distortion in the waveform of a driving signal for the light source or a temporal change in the light amount incoming from outside into the space, there is little influence on the integrals used to determine the spatial information. As a result, it is possible to determine the spatial information with higher detecting accuracy, as compared with the case that the detecting accuracy of the spatial information depends on the shape of waveform.

It is preferred that the photoelectric converter includes a doped semiconductor layer and an insulating layer on the semiconductor layer, the at least one electrode is formed on a general surface of the doped semiconductor layer through the insulating layer, and the charge collection area is a potential well formed in the doped semiconductor layer by applying the control voltage to the at least one electrode. In this case, the semiconductor layer functions as the photoelectric converter and the charge collection area.

It is preferred that a plurality of electrodes are arranged as the at least one electrode on the doped semiconductor layer through the insulating layer, and the control circuit changes the number of the electrodes, to which the control voltage is applied, with passage of time. This configuration is particularly useful to control the sensitivity of the light receiving device having the MIS (metal-insulator-semiconductor) structure.

It is preferred that the control circuit changes a magnitude of the control voltage applied to the electrodes such that a first potential well is formed as the charge collection area in a charge holding period that the control voltage is applied to a required number of the electrodes, and a second potential well is formed to have a larger depth than the first potential well in a charge generation period that the number of the electrodes, to which the control voltage is applied, is larger than the case of the charge holding period. In this case, it is possible to prevent that dispensable electric charges flow in the charge collection area, and achieve an improved S/N ratio.

It is preferred that the control circuit controls magnitudes of the control voltages applied to the electrodes in the charge generation period such that the second potential well has a large depth at a region of the photoelectric converter corresponding to the electrode(s), to which the control voltage is applied in the charge holding period, and a small depth at another regions of the photoelectric converter adjacent to the region having the large depth In this case, as soon as the electric charges are generated in the region having the small depth of the second potential well formed in the charge generation period, they can smoothly flow in the region having the large depth of the second potential well. Therefore, it is possible to reduce a probability that the electric charges generated in each of the photoelectric converters improperly flow in the charge collection area formed in an adjacent photoelectric converter. As a result, it is possible to provide the spatial information detecting apparatus with an improved S/N ratio.

It is also preferred that the electrode(s), to which the control voltage is applied to form the first potential well that is the charge collection area, has a light-shielding film. In this case, since the generation of dispensable electric charges in the vicinity of the first potential well is prevented by the light-shielding film, it is possible to further improve the S/N ratio.

It is preferred that the analyzer includes determining a phase difference between the light irradiated into the space and the light received by the photoelectric converter, and converting the phase difference into distance information. In this case, it is possible to determine the distance between the apparatus and an object in the space as the spatial information from the phase difference.

A further object of the present invention is to provide a method of controlling sensitivity of a light receiving element comprising:

a photoelectric converter for receiving a light at a light receiving surface and generating amounts of electric charges corresponding to an intensity of received light;

at least one electrode formed on the photoelectric converter;

a charge collection area induced in the photoelectric converter by applying a control voltage to the at least one electrode to collect at least part of the electric charges generated in the photoelectric converter; and a charge ejector for outputting the electric charges from the charge collection area, wherein the method is characterized by comprising the step of controlling the control voltage applied to the at least one electrode to change size of the charge collection area in the light receiving surface of the photoelectric converter.

These and still other objects and advantages of the present invention will become more apparent from detail description of the preferred embodiments explained below, referring to the attached drawings.

DETAIL DESCRIPTION OF THE PREFERRED EMBODIMENTS OF THE INVENTION

According to the following preferred embodiments, a light receiving device with controllable sensitivity and a spatial information detecting apparatus of the present invention are explained in detail. However, needless to say, the present invention is not limited to these embodiments. In particular, It should be interpreted that the light receiving device of the present invention is available to any apparatus using the received light other than a distance measuring apparatus introduced as an example of the spatial information detecting apparatus.

(First Embodiment)

Figure 1A:
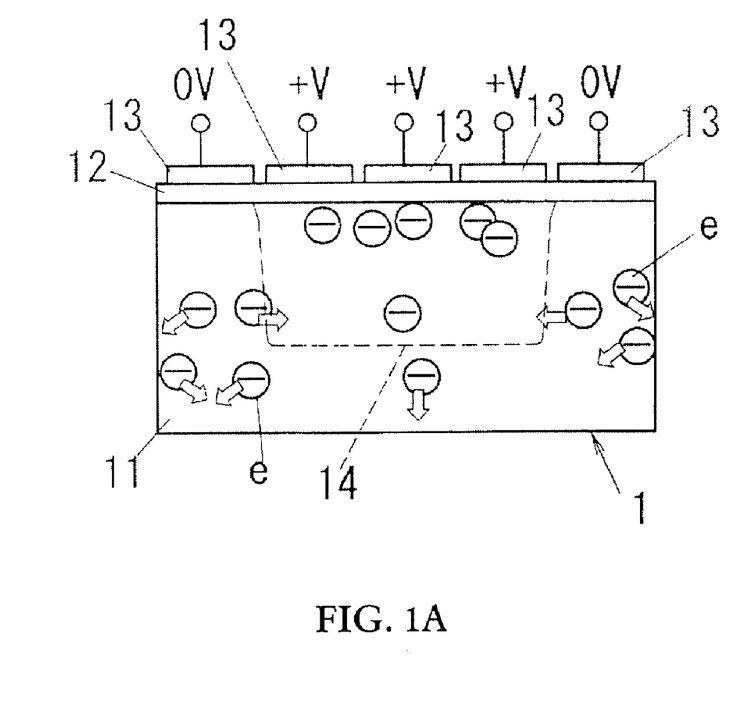
FIGS. 1A and 1B are explanatory diagrams illustrating a sensitivity control method for a light receiving device of the present invention.
Figure 1B:
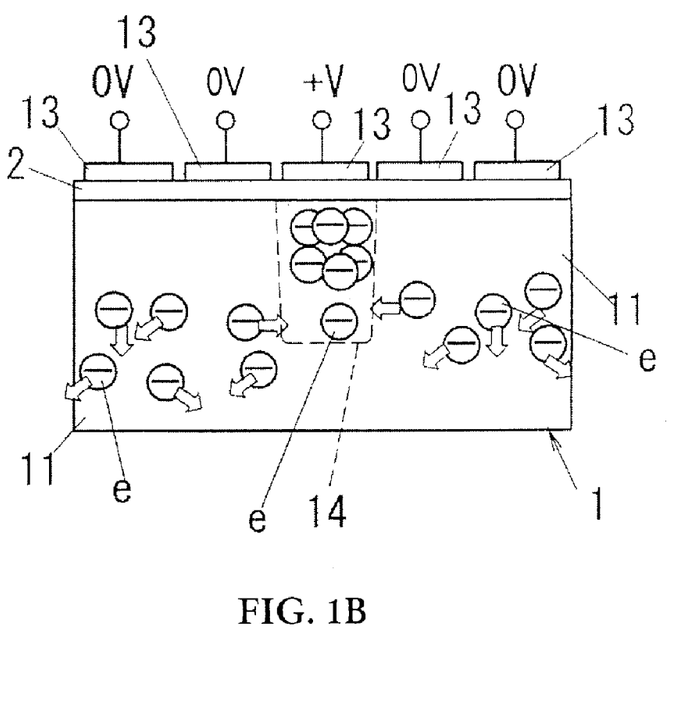

A light receiving device 1 of the present embodiment is shown in FIGS. 1A and 1B. This light receiving element 1 has a photoelectric converter for receiving a light at a light receiving surface and generating amounts of electric charges corresponding to an intensity of received light, and a plurality of electrodes formed on the photoelectric converter. The photoelectric converter is composed of a doped semiconductor layer 11 and, an insulating film 12 such as an oxide film formed on a general surface of the semiconductor layer 11. The electrodes 13 are formed on the semiconductor layer 11 through the insulating film 12.

The light receiving device having such a structure is known as the MIS (Metal-Insulator-Semiconductor) device. However, the light receiving device 1 of this embodiment is different from the conventional MIS device in that a plurality of electrodes (for example, five electrodes shown in FIG. 1A) are formed on a region of the photoelectric converter that effects as a single light receiving device. The insulating film 12 and the electrodes 13 are made of a translucent material. When a light is incident on the semiconductor layer 11 through the insulating film 12, electric charges are generated in the semiconductor layer 11. Since the semiconductor layer 11 shown in FIG. 1A is an n-type semiconductor layer, the generated electric charges are electrons (e).

When a positive control voltage (+V) is applied to the electrodes 13, a potential well 14 (depletion layer) is formed at a region corresponding to the electrode position in the semiconductor layer 11. That is, when the light is incident on the semiconductor layer 11 under the condition that the control voltage is being applied to the electrodes 13 to form the potential well 14, parts of electrons generated in the semiconductor layer 11 are captured in the potential well, and the balance of the generated electrons are lost by direct recombination with holes at a deep portion of the semiconductor layer 11.

As described above, since the potential well 14 is formed at the region of the photoelectric converter corresponding to the position of the electrode(s), to which the control voltage is applied, it is possible to control a size of the potential well 14 in a direction along the general surface of the semiconductor layer 11 (in other words, the size of a charge collection area in the light receiving surface) by changing the number of the electrodes, to which the control voltage is applied.

A ratio of amounts of electric charges captured in the potential well to the amounts of electric charges generated in the semiconductor layer 11 can be changed in response to the size of the potential well. Therefore, when the electric charges captured in the potential well formed as the charge collection area are output as signal charges, controlling the number of the electrodes, to which the control voltage is applied, substantially means adjusting the sensitivity of the light receiving device 1. Thus, the light receiving device of the present invention is characterized by having a sensitivity controller for controlling the sensitivity of the light receiving device according to the above manner.

For example, when the control voltage (+V) is applied to three of the five electrodes 13, as shown in FIG. 1A, the potential well 14 is formed over a region corresponding to the three electrodes in the semiconductor layer 11, as shown by the dotted line in FIG. 1A. On the other hand, when the control voltage (+V) is applied to the center one of the five electrodes 13, the potential well 14 is formed over a region corresponding to the one electrode in the semiconductor layer 11, as shown by the dotted line in FIG. 1B. Since a depth of the potential well 14 of FIG. 1A is equal to the depth of the potential well 14 of FIG. 1B, the size of the potential well of FIG. 1A is larger than that of the potential well of FIG. 1B. Therefore, when the same light amount is supplied into each of the light receiving devices of FIGS. 1A and 1B, the potential well of FIG. 1A can output larger amounts of signal charges. This means that the light receiving device 1 has a higher sensitivity in the case of FIG. 1A, as compared with the case of FIG. 1B.

In the above-explained light receiving device 1, the same technique used in a conventional frame transfer CCD can be used to output the signal charges from the potential well 14 (i.e., the charge collection area). That is, after electrons are captured in the potential well 14 formed by applying the control voltage to a required number of the electrodes 13, the captured electrons can be output from the potential well through an output electrode (not shown) of the light receiving device 1 according to the same manner as the conventional frame transfer CCD, (e.g., by controlling a voltage applying pattern).

Next, as an example of a spatial information detecting apparatus using the above-described technical concept, a distance measuring apparatus is explained. According to this apparatus, it is possible to determine a distance between the apparatus and an object placed in a space from a difference between an original phase of a intensity-modulated light irradiated into the space and the phase of the light received by the light receiving device 1.

Figure 2:
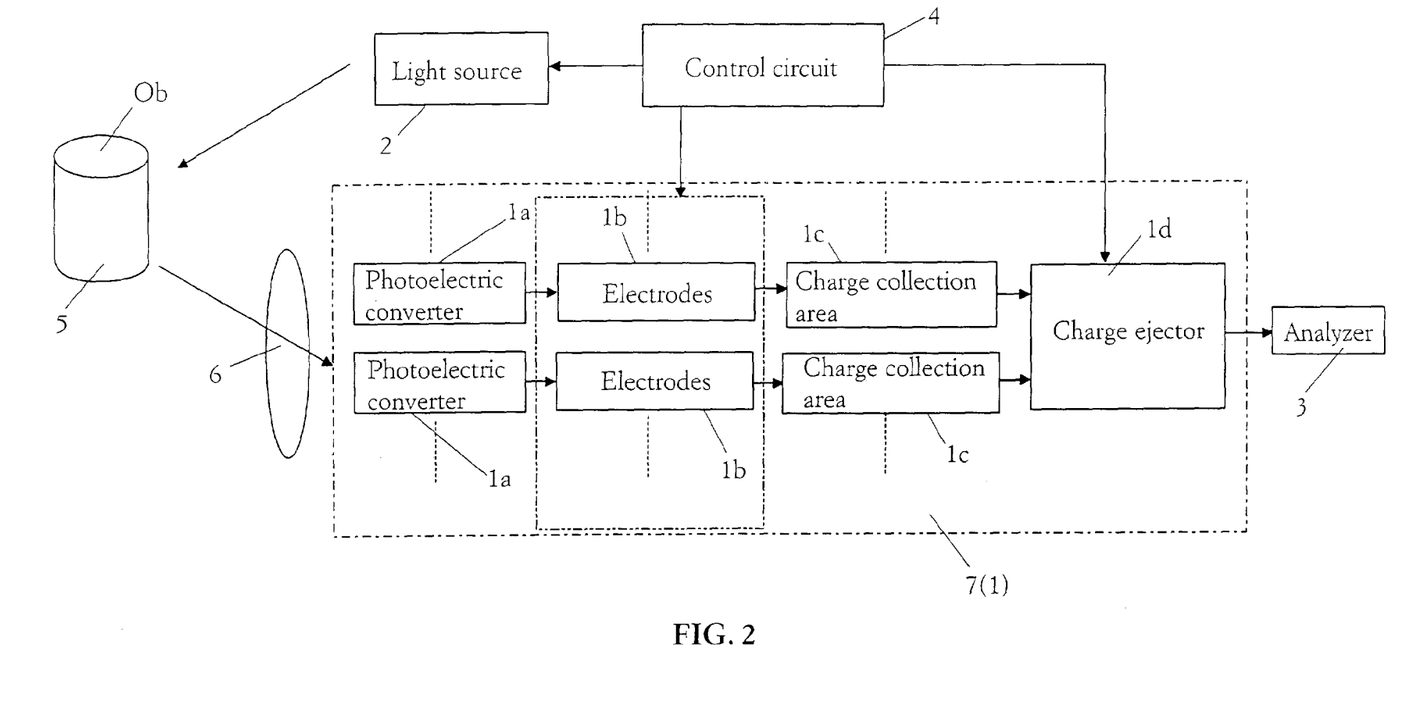
FIG. 2 is a block diagram of a distance measuring apparatus according to a preferred embodiment of the invention.

FIG. 2 is a block diagram of this distance measuring device. The reference numeral "2" designates a light source for irradiating a light into a space, in which an object 5 is placed. The light emitted from the light source 2 is intensity-modulated at a predetermined modulation frequency (i.e., emission frequency) by a control circuit 4. As the light source 2, for example, it is possible to use an array of light emitting diodes (LED) or a combination of a semiconductor laser and a divergent lens. For example, the control circuit 4 may intensity-modulate the light emitted from the light source 2 by a sine wave of 20 MHz.

The intensity-modulated light is reflected by the object 5, and then the reflected light is incident on a plurality of photoelectric converters 1a through a required optical system 6. Each of the photoelectric converters 1a has the structure shown in FIGS. 1A and 1B, and generates an electric output corresponding to an intensity of received light. For example, an image sensor 7 that is a matrix array of 100×100 photoelectric converters can be used as the light receiving device of the distance measuring device. Three dimensional information of the object 5 is mapped on a 2-dimensional planar surface that is the light receiving surface of the image sensor 7 by use of the optical system 6.

This type of the image sensor 7 can be obtained by forming the photoelectric converters 1a in a single semiconductor substrate according to a matrix arrangement. In each column of the matrix pattern of the photoelectric converters 1a, a single doped semiconductor layer 11 is commonly used as a vertical transfer portion to transfer the electric charges (electrons "e") in the columnar direction. On the other hand, the electric charges provided from an end of the semiconductor layer 11 of each column of the matrix pattern are transferred in the row direction through a horizontal transfer portion. Since these vertical and horizontal transfer portions are similar to configurations of the conventional frame transfer CCD image sensor, further detailed explanation is omitted.

As described above, to adjust the sensitivity of each of photoelectric converters, the number of the electrodes 1b, to which the control voltage is applied, can be controlled by the control circuit 4. After the electric charges (electrons "e") are captured in the charge collection area 1c, which is the potential well 14 formed in each of the photoelectric converters 1a by applying the control voltage to the required number of the electrodes 13, the captured electrons are output as signal charges from the charge collection area by the charge ejector 1d. In this embodiment, the electrodes 1b can be used to control the sensitivity and output the signal charges. In other words, since the captured electrons are output as the signal charges from the charge collection area by changing a pattern of applying the control voltage to the electrodes, the electrodes can also function for the charge ejector 1d.

In this embodiment, to determine the phase difference between the light irradiated from the light source 2 into the space and the light received by the photoelectric converters 1a, the sensitivity is controlled by the control circuit 4 at a timing synchronized with a period of the modulation signal for driving the light source 2. That is, high and low sensitivity states of the light receiving device are alternately repeated by a repetition period synchronized with the period of the modulation signal by the control circuit 4.

Figure 3:
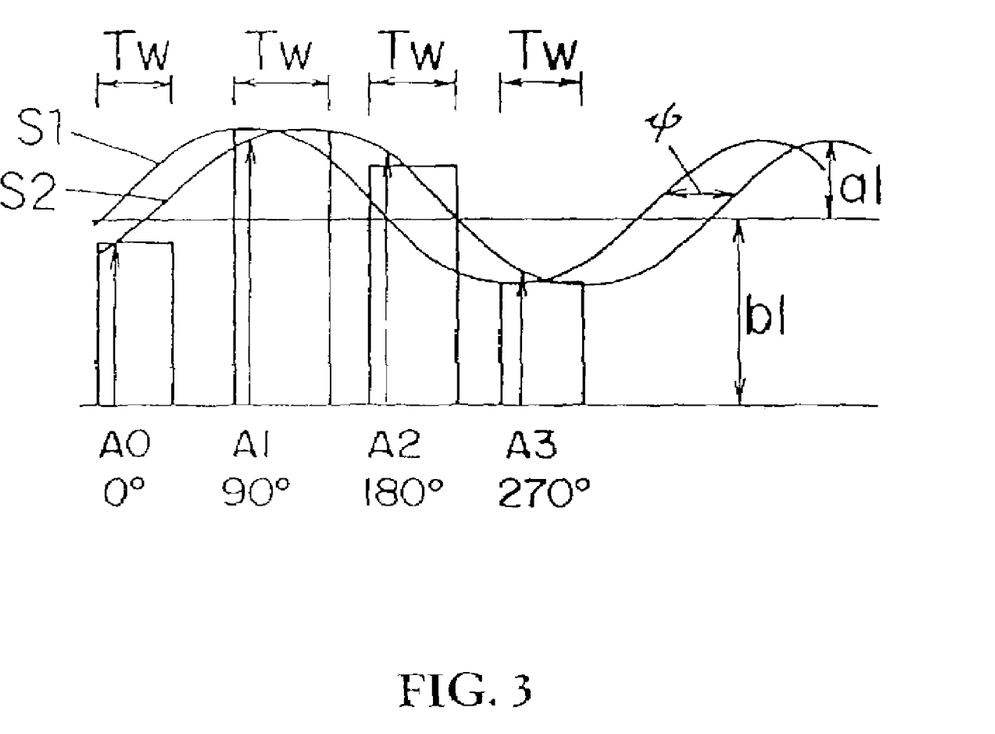
FIG. 3 is an explanatory diagram illustrating the principle of operation of the distance measuring device.

As shown in FIG. 3, when the light emitted from the light source is intensity-modulated, as shown by the curve "S1" of FIG. 3, and the modulated light reflected from the object in the space is received by the photoelectric converter, the intensity of received light changes, for example, as shown by the curve "S2" of FIG. 3. In this case, to determine a phase difference "$\psi$", it is needed to detect the intensities of received light at different phases with respect to the curve "S2". For example, four intensities (A0, A1, A2, A3) of received light are detected at 4 different phases (0°, 90°, 180°, 270°). By the way, in the present circumstances, it is impossible to detect the intensity of light received at just the moment of the each of the phases (0°, 90°, 180°, 270°).

However, it's a fact that each of the intensities of received light substantially corresponds to the intensity of light received within a time width "Tw", as shown in FIG. 3. On the assumption that the phase difference "$\psi$" does not change within the modulation period, and there is no change in light extinction ratio within a time period from the time of emitting the light to the time of receiving the light (In FIG. 3, the light extinction ratio is not considered), the relationship between the intensities (A0, A1, A2, A3) of received light and the phase difference "$\psi$" can be represented by the following equation:

$$\psi = \tan^{-1}\{(A3-A1)/(A0-A2)\}$$

In this case, when the sensitivity is controlled by the control circuit 4 such that the high sensitivity state is maintained within the time width "Tw" at the timing of determining the intensities (A0, A1, A2, A3) of received light, it is possible to capture amounts of signal charges corresponding to each of the intensities of received light in the charge collection area 1c.

The signal charges captured in the charge collection area 1c are transferred to an analyzer 3 by the charge ejector 1d every time that the signal charges corresponding to each of the four intensities (A0, A1, A2, A3) of received light are detected. Alternatively, when a plurality of photoelectric converters are prepared to separately detect the signal charges corresponding to each of the four intensities of received light, the signal charges may be sent to the analyzer 3 at a time after all of the signal charges corresponding to the four intensities of received light are detected. In the analyzer, the phase difference is obtained by according to an output of the charge ejector 1d, and the distance between the apparatus and the object is determined from the obtained phase difference and the modulation frequency.

By the way, according to the distance measuring apparatus of this embodiment since the semiconductor layer 11 is commonly used for both of the photoelectric converter 1a and the charge collection area 1c, the control circuit 4 needs to control the control voltage applied to the electrodes 1b such that the high sensitivity status is maintained within a charge generation period of generating the electric charges in the semiconductor layer 11 and then the low sensitivity status is maintained within a charge holding period to allow the semiconductor layer 11 to effect as the charge collection area 1c for capturing the generated electric charges.

As a result, dispensable electric charges other than the signal charges may be mixed in the charge collection area 1c. However, the charge collection area 1c becomes small for the charge holding period, in which the light receiving device is in the low sensitivity status. In addition, it is expected that the dispensable electric charges other than the signal charges are uniformly mixed to the signal charges corresponding to each of the four intensities (A0, A1, A2, A3) of received light. Therefore, it is regarded that an influence of the dispensable electric charges can be eliminated together with the influence of disturbance light by performing the operations (A3−A1) and (A0−A2) of the above equation for determining the phase difference "ψ".

In addition, to prevent that the dispensable electric charges are mixed in the signal charges within the charge holding period, in which the charge collection area 1c is small, as shown in FIG. 1B, it is particularly preferred to form a light shielding film in the vicinity of the electrode(s) corresponding to the charge collection area 1c formed in the charge holding period.

In the above explanation, the four intensities (A0, A1, A2, A3) of received light were detected at 4 different phases (0°, 90°, 180°, 270°) spaced from each other by 90 degrees. However, needless to say, it is not essential in the present invention to detect the intensities of received light every 90 degrees, and capture the signal charges corresponding to the four intensities of received light within one period of the modulation signal. In addition, the light emitted from the light source was intensity-modulated by the sine wave in this embodiment. However, the intensity-modulation may be performed by use of another waveform such as a triangular wave or a saw-tooth wave.

Under the influence of disturbance light such as sun light and illumination, it is preferred that an optical filter for transmitting only a wavelength of the light emitted from the light source 2 is placed before the photoelectric converters 1a. The use of this optical filter is also useful in the following embodiments.

In addition, the analyzer 3 of this embodiment was designed to determine the distance between the apparatus and the object. However, if necessary, a different analyzer may be used to determine another spatial information from the output of the light receiving device.

(Second Embodiment)

In the first embodiment, the signal charges were extracted in synchronization with the period of the modulation signal. However, when the modulation frequency is 20 MHz, a time period available to extract the signal charges within one period of the modulation signal is extremely short, i.e., approximately several ten nanoseconds. In such a case, a distortion in waveform of the control voltage applied to the electrode(s) has a direct impact on the measuring accuracy of the phase difference "ψ". Similarly, a distortion in waveform of the light emitted from the light source also has a direct impact on the measuring accuracy of the phase difference "ψ".

Figure 4:
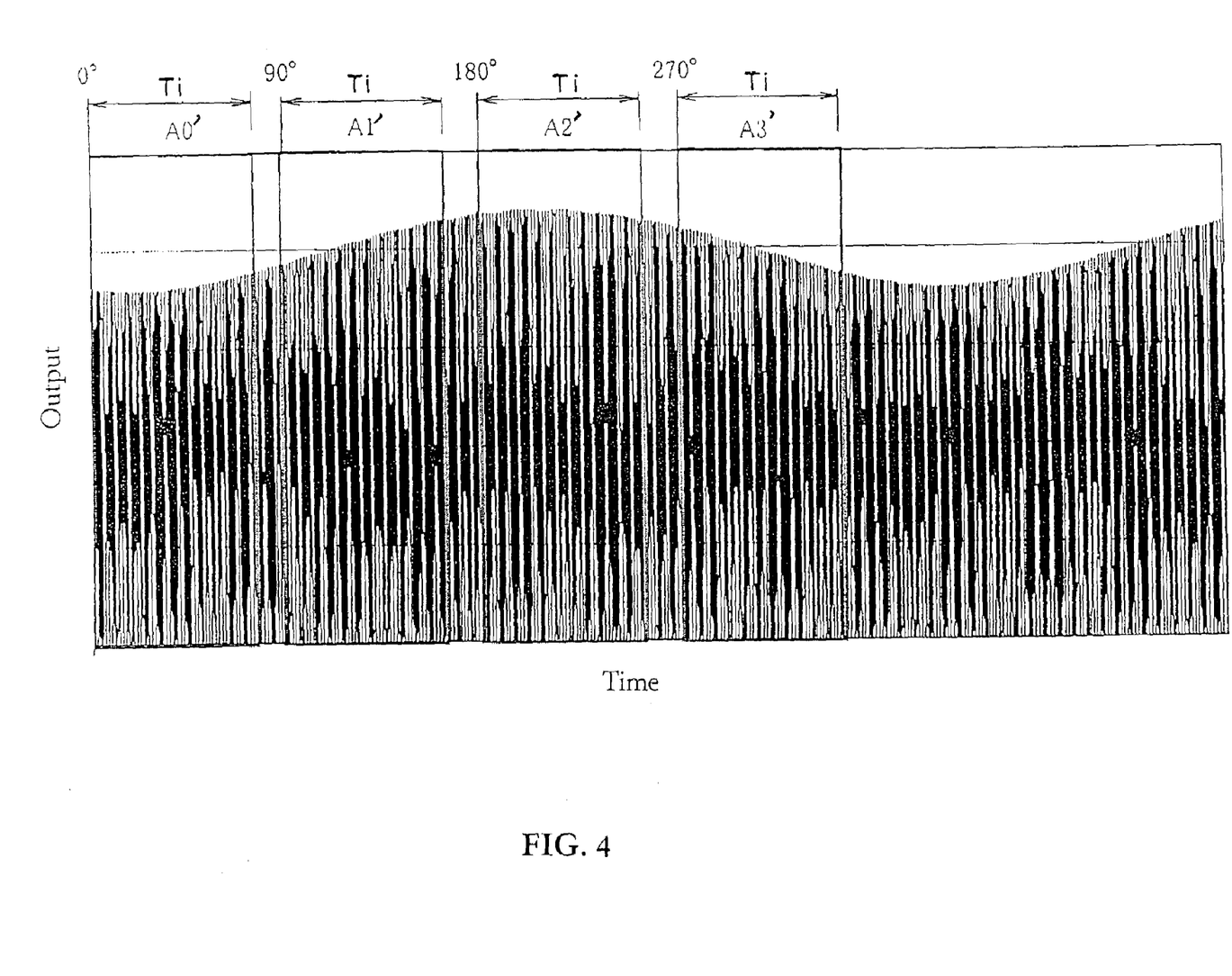
FIG. 4 is an explanatory diagram illustrating the principle of operation of a distance measuring apparatus according to another preferred embodiment of the present invention.

In this embodiment, the control circuit 4 controls the control voltage applied to the electrodes in accordance with a local oscillator frequency different from the modulation frequency. That is, the modulation frequency is mixed with the local oscillator frequency to obtain a beat signal, as shown in FIG. 4, which has an envelope component of a frequency difference between a local oscillator signal provided by the control circuit 4 and electric charges corresponding to the light amount received by the photoelectric converter 1a, i.e., the received light signal, so that the signal charges corresponding to the beat signal are collected in the charge collection area 1c. The period of the beat signal depends on the frequency difference between the modulation frequency and local oscillator frequency. For example, when the frequency difference is 300 kHz, the period of the beat signal is approximately 3 μs. Thus, the phase difference "ψ" is detected by use of this beat signal. In this case, there is an advantage that the phase difference "ψ" can be detected without the influence of distortion in waveform under conditions that periodicity of waveform of the control voltage and periodicity of waveform of the modulation signal are maintained.

When there is no temporal change in the distance between the distance measuring apparatus and the object, the phase of the beat signal can be determined according to a relationship among the phase of the light emitted from the light source 2, the phase of the local oscillator signal provided by the control circuit 4 and the phase of the received light signal of the photoelectric converter 1a. That is, an intensity (Y 1) of the received light signal is represented by the following equation:

$$Y1 = b1 + a1 \cdot \cos(\omega 1 \cdot t + \psi)$$

wherein "ω1" designates an angular frequency corresponding to the modulation frequency, "ψ" designates a phase difference between the phase of the light emitted from the light source and the phase of the received light signal, "a 1" designates a constant corresponding to an amplitude of the received light signal, and "b 1" designates a constant corresponding to dark current or outside light (temporal change is not considered).

On the other hand, an intensity (Y 2) of the local oscillator signal is represented by the following equation:

$$Y2 = b2 + a2 \cdot \cos(\omega 2 \cdot t)$$

wherein "ω2" designates an angular frequency of the local oscillator signal, "a 2" designates a constant corresponding to an amplitude of the local oscillator signal, and "b 2" designates a constant corresponding to direct bias.

Since the mixed signal of the received light signal and the local oscillator signal is (Y 1·Y 2), the beat signal having the envelope component corresponding to the difference between the modulation frequency and the frequency of the local oscillator signal is obtained. The phase difference "ψ" is directly reflected to the phase of the envelope component.

That is, the signal charges are extracted in synchronization with the period of the beat signal to determine the phase difference "ψ". However, since the beat signal includes fluctuation components of the light amount derived from the modulation signal, it is needed to extract the envelope component of the beat signal to obtain the signal charges. In this embodiment, electric charges generated within a time width "Ti" shown in FIG. 4 in synchronization with the period of the beat signal are collected in the charge collection area 1c. That is, the high sensitivity status of the light receiving device is maintained within the time period corresponding to the time width "Ti".

On the other hand, within a time period other than the time width "Ti", the low sensitivity status of the light receiving device is maintained. Therefore, integration of the beat signal over the time width "Ti" are performed at the charge collection area 1c, so that the fluctuation components derived from the modulation signal are eliminated, and the signal charges are captured in the charge collection area 1c at an amount proportional to the envelope component of the beat signal. In other words, it means that the charge collection area 1c performs an envelope detection of the beat signal.

For example, the signal charges can be collected in the charge collection area 1c at the specific four phases, i.e., 0°, 90°, 180° and 270°, within one period of the beat signal. The signal charges collected at each of the four phases is equal to an integral (A0, A1, A2, A3) obtained by performing integration of the beat signal over the time width "Ti". These integrals (A0', A1', A2', A3') can be handled, as in the case of handling the intensities (A0, A1, A2, A3) of received light the first embodiment. Therefore, the phase difference "ψ" is obtained by substituting those integrals (A0', A1', A2', A3') into the following equation:

$$\psi = \tan^{-1}\{(A3'-A1')/(A0'-A2')\}.$$

In this embodiment, since the phase difference "ψ" is obtained by use of the four integrals determined in synchronization with the period of the beat signal, it is possible to determine the phase difference "ψ" even when the local oscillator signal is generated without being synchronized with the light emitted from the light source 2 under a condition of preventing the modulation frequency and the local oscillator frequency from frequency error.

In addition, since the integrals (A0', A1', A2', A3') of the beat signal having a frequency sufficiently lower than the modulation frequency are used to determine the phase difference "ψ", it is possible to reduce the influence of noise components such as dark current or outside light, and achieve a high S/N ratio.

In this embodiment, the four integrals (A0', A1', A2', A3') were determined every quarter period of the beat signal within one period of the beat signal. However, needless to say, it is not essential in the present invention to use quarter period of the beat signal as the timing of determining the respective integral, and determine the four integrals within one period of the beat signal. Other configuration and performance are similar to the first embodiment.

(Third Embodiment)

In the second embodiment, the four integrals (A0', A1', A2', A3') were determined at different timings, i.e., every quarter period of the beat signal, to determine the phase difference "ψ". In this embodiment, the four integrals (A0', A1', A2', A3') can be simultaneously determined. That is, by using a pair of beat signals, one of which is different from the other one by the phase of 180 degrees, two pairs of the integrals (A0', A1') and (A2', A3') are simultaneously determined.

To simultaneously determine the two pairs of the integrals (A0', A1') and (A2', A3'), one pixel is composed of a pair of photoelectric converters 1a, and the control circuit 4 generates two kinds of local oscillator signals, which are in an antiphase relation with each other, but have the same local oscillator frequency. Therefore, the two kinds of local oscillator signals are respectively given to the electrode(s) formed on the pair of the photoelectric converters. Thus, by giving the two kinds of local oscillator signals that are in the antiphase relation with each other to the electrode(s), a pair of the beat signals having the antiphase relation with each other can be obtained.

Figure 5A:
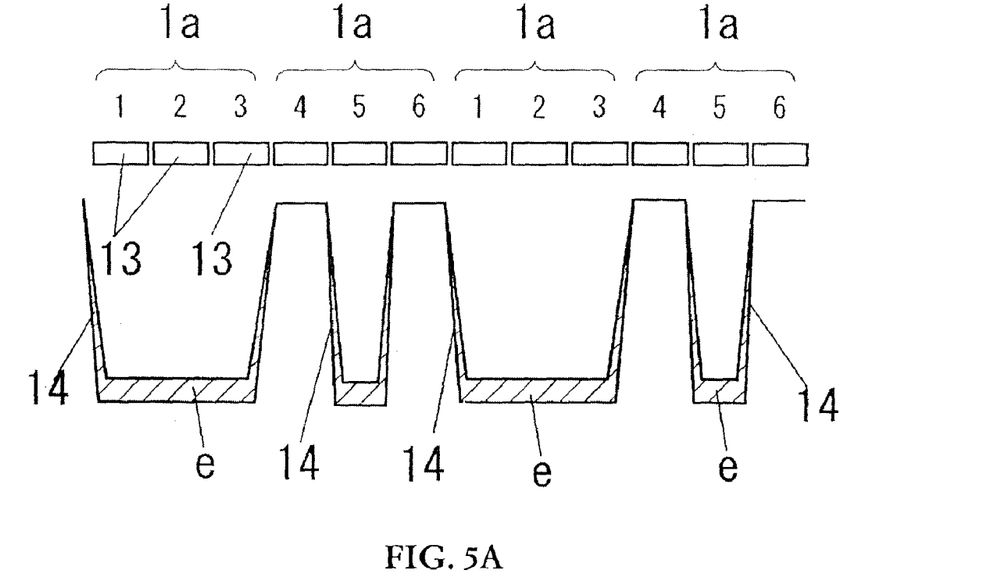
FIGS. 5A and 5B are schematic diagrams illustrating an example of potential wells formed in the light receiving device of the present invention.
Figure 5B:
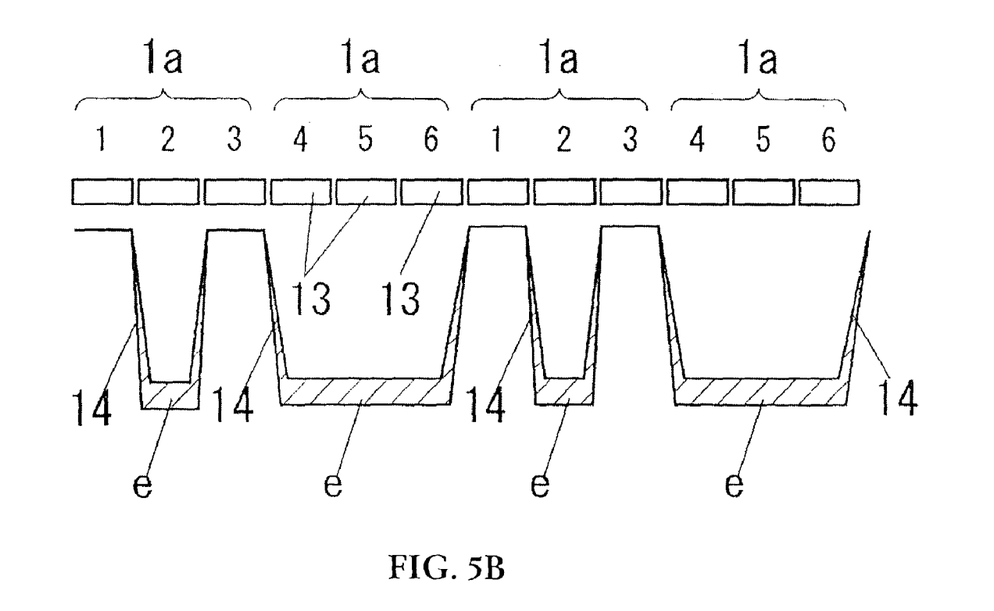

As shown in FIGS. 5A and 5B, three electrodes 13 are formed on each of the pair of photoelectric converters 1a. In the following explanation, to separately understand the electrodes 13 for one pixel, the electrodes 13 are numbered as (1) to (6). That is, one of the pair of photoelectric converters has the electrodes (1) to (3), and the other one has the electrodes (4) to (6). In this case, it is preferred to form overflow drains corresponding to the photoelectric converters with respect to each pixel.

As explained above, the control circuit 4 controls the control voltage applied to the electrode(s) to change an area of the potential well 14 in the light receiving surface, i.e., the size of the charge collection area 1c. Therefore, giving the local oscillator signals, which are in the antiphase relationship with each other, to the electrodes 13 formed on the pair of photoelectric converters 1a constructing one pixel means alternately switching the area of the potential well 14 formed in each of the adjacent photoelectric converters 1a between two stages of large and small areas.

That is, as shown in FIG. 5A, the potential well 14 having the large area can be obtained when the same control voltage is applied to all of the electrodes (1) to (3) with respect to one of the pair of photoelectric converters 1a. With respect to the other one of the pair of photoelectric converters, the control voltage is applied to only the center electrode (5) of the electrodes (4) to (6) to obtain the potential well 14 having the small area. Thus, when the potential well 14 having the large area is formed in one of the pair of photoelectric converters, the potential well 14 having the small area is formed in the other one.

In other words, the potential well 14 having the large area obtained by applying the control voltage to the three electrodes (1) to (3) is in the high sensitivity state, and the potential well 14 having the small area obtained by applying the control voltage to only the center electrode (5) is in the low sensitivity state. Therefore, when the light is incident on the photoelectric converter corresponding to the electrodes (4) to (6), amounts of electric charges (electrons "e") generated in this photoelectric converter are negligibly small. Under this condition, the electric charges corresponding to the integral (A0') or (A2') can be collected in the potential well 14.

In addition, as shown in FIG. 5B, the potential well 14 having the large area can be obtained when the same control voltage is applied to all of the electrodes (4) to (6) with respect to one of the pair of photoelectric converters. With respect to the other one of the pair of photoelectric converters, the control voltage is applied to only the center electrode (2) of the electrodes (1) to (3) to obtain the potential well 14 having the small area. In other words, the potential well 14 having the large area obtained by applying the control voltage to the three electrodes (4) to (6) is in the high sensitivity state, and the potential well 14 having the small area obtained by applying the control voltage to only the center electrode (2) is in the low sensitivity state. Therefore, when the light is incident on the photoelectric converter corresponding to the electrodes (1) to (3), electric charges (electrons "e") generated in this photoelectric converter are negligibly small. Under this condition, the electric charges corresponding to the integral (A1') or (A3') can be collected in the potential well 14.

The stages shown in FIGS. 5A and 5B are alternately repeated within the time period of determining the integrals (A0', A1') and within the time period of determining the integrals (A2', A3'). That is, by alternately repeating the stages of FIG. 5A and FIG. 5B within the time period of determining the integral (A0') shown in FIG. 4, the signal charges corresponding to the integrals (A0') and (A1') are respectively collected in the potential wells corresponding to the pair of photoelectric converters 1a. Similarly, by alternately repeating the stages of FIG. 5A and FIG. 5B within the time period of determining the integral (A2') shown in FIG. 4, the signal charges corresponding to the integrals (A2') and (A3') are respectively collected in the potential wells corresponding to the pair of photoelectric converters 1a.

In this embodiment, in each of the cases of FIGS. 5A and 5B, the control voltage simultaneously applied to the three electrodes (1) to (3) or the three electrodes (4) to (6) is substantially the same as the control voltage applied to only the electrode (2) or (5).

As described above, after the signal charges corresponding to the integral (A0') are collected in the potential well 14, which is formed in the photoelectric converter 1a by applying the control voltage to the electrodes (1) to (3), as shown in FIG. 5A, and the signal charges corresponding to the integral (A1') are collected in the potential well 14, which is formed in the photoelectric converter 1a by applying the control voltage to the electrodes (4) to (6), as shown in FIG. 5B, these integrals (A0') and (A1') are output by the charge ejector 1d. Next, after the signal charges corresponding to the integral (A2') are collected in the potential well 14, which is formed in the photoelectric converter 1a by applying the control voltage to the electrodes (1) to (3), as shown in FIG. 5A, and the signal charges corresponding to the integral (A3') are collected in the potential well 14, which is formed in the photoelectric converter 1a by applying the control voltage to the electrodes (4) to (6), as shown in FIG. 5B, these integrals (A2') and (A3') are output by the charge ejector 1d.

By repeating the above procedures, it is possible to obtain the signal charges corresponding to the four integrals (A0', A1', A2', A3') by the two output operations, and determine the phase difference "ψ" from these signal charges. In the above explanation, controlling is performed such that when the potential well 14 corresponding to one of the pair of photoelectric converters 1a constructing one pixel has the large area, the potential well 14 corresponding to the other one has the small area. In brief, one of the pair photoelectric converters is placed in the charge generation period to mainly generate the electric charges, and the other photoelectric converter is placed in the charge holding period to hold the electric charges.

By the way, when the light is incident on the potential well having the small area within the charge holding period, small amounts of electric charges may be generated in the potential well. In this case, there is a possibility that part of the signal charges corresponding to the integrals (A2') and (A3') are mixed in the charge collection area 1c holding the signal charges corresponding to the integrals (A0') and (A1'), and on the other hand, part of the signal charges corresponding to the integrals (A0') and (A1') are mixed in the charge collection area 1c holding the signal charges corresponding to the integrals (A2') and (A3').

As a result, dispensable electric charges mixed in the desired signal charges become a cause of the occurrence of noise components. However, amounts of the dispensable electric charges are much smaller than the amounts of the signal charges. In addition, it can be regarded that a ratio of the dispensable electric charges relative to the signal charges is substantially constant. Moreover, most of the dispensable electric changes can be removed by the subtracting operations of (A3'−A1') and (A0'−A2') for determining the phase difference "ψ". Thus, the influence of such noise components can be reduced at the time of determining the phase difference "ψ". Other configuration and performance are similar to the second embodiment.

(Fourth Embodiment)

In the third embodiment, the area of the potential well 14 in the light receiving surface was controlled by changing the number of the electrodes to which the control voltage is applied. However, since the control voltage simultaneously applied to the three electrodes (1) to (3) or the three electrodes (4) to (6) is substantially the same as the control voltage applied to only the electrode (2) or (5), the depth of the potential well 14 is constant irrespective of the number of the electrodes 13 to which the control voltage is applied.

Figure 6A:
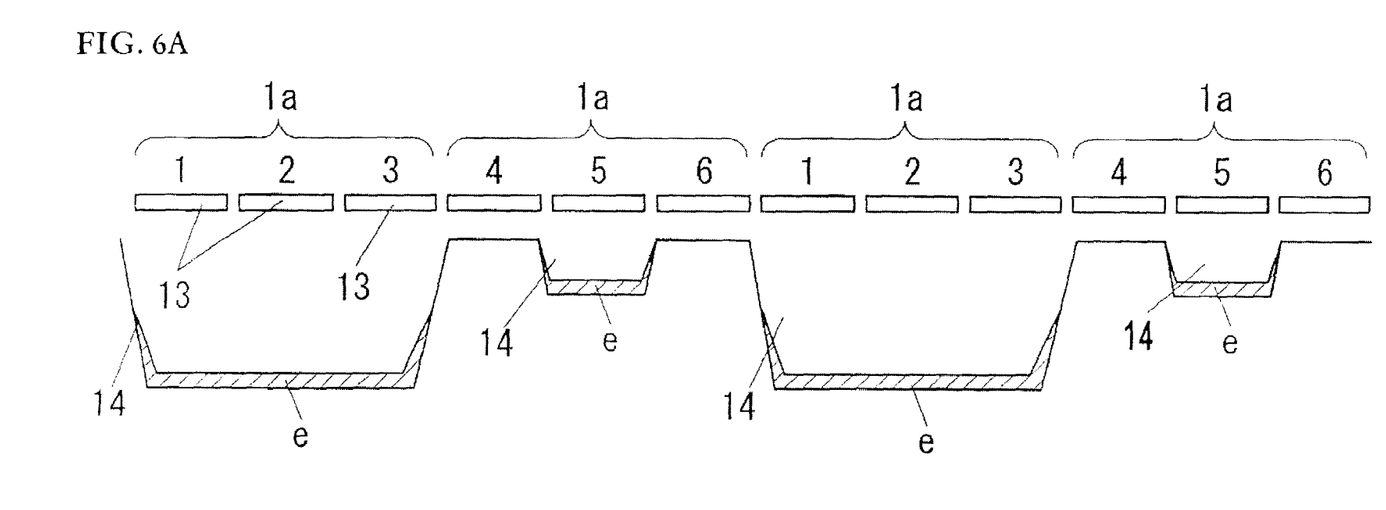
FIGS. 6A and 6B are schematic diagrams illustrating a further example of potential wells formed in the light receiving device of the present invention.
Figure 6B:
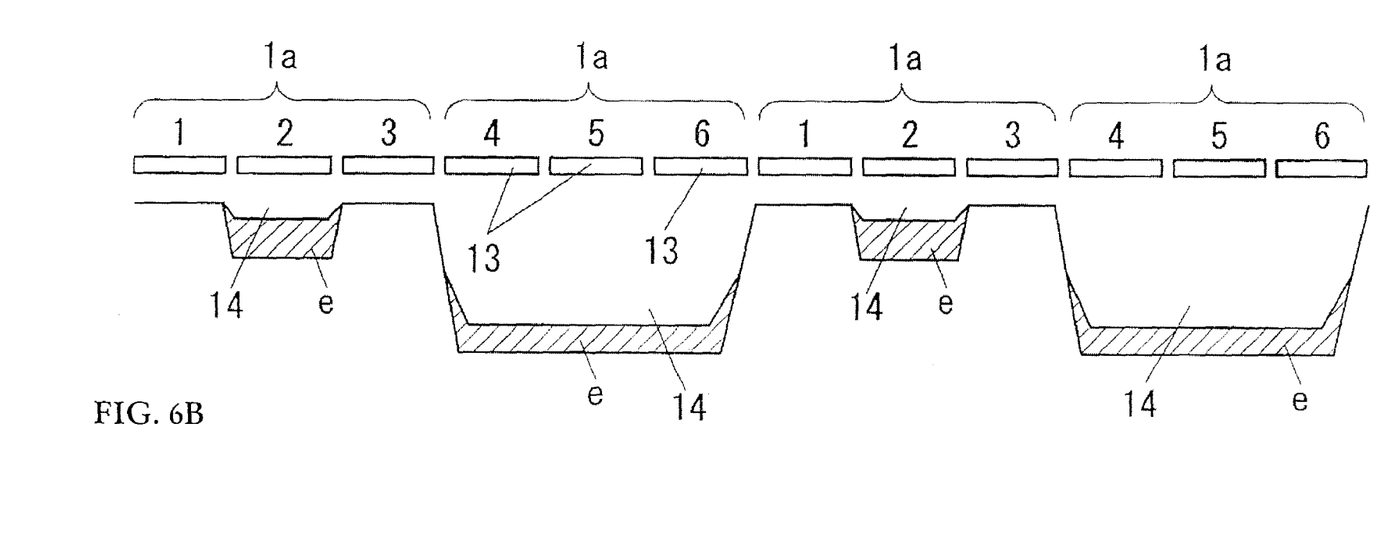

The basic configuration of this embodiment is substantially the same as the third embodiment. However, in this embodiment, the control voltage simultaneously applied to the three electrodes (1) to (3) or the three electrodes (4) to (6) is larger than the control voltage applied to only the electrode (2) or (5). Therefore, as shown in FIGS. 6A and 6B, it is characterized in that the depth of the potential well having the small area, which is formed when the control voltage is applied to only the electrode (2) or (5), is smaller than the depth of the potential well having the large area, which is formed when the control voltage is simultaneously applied to the three electrodes (1) to (3) or the three electrodes (4) to (6).

For example, the control voltage applied to the three electrodes (1) to (3) or the three electrodes (4) to (6) to obtain the potential well 14 having the large area may be 7V, and the control voltage applied to only the electrode (2) or (5) to obtain the potential well 14 having the small area may be 3V. Thus, since the potential well 14 for mainly generating the electric charges (electrons "e") has a large depth than the potential well 14 for holding the electric charges, the electric charges generated in a region of the photoelectric converter corresponding to the electrodes (1) and (3) or (4) and (6) can easily flow in the potential well having the large depth, so that amounts of noise components that flow in the potential well 14 for holding the electric charges can be reduced, as compared with the case of the third embodiment. Other configuration and performance are similar to the third embodiment.

(Fifth Embodiment)

Figure 7A:
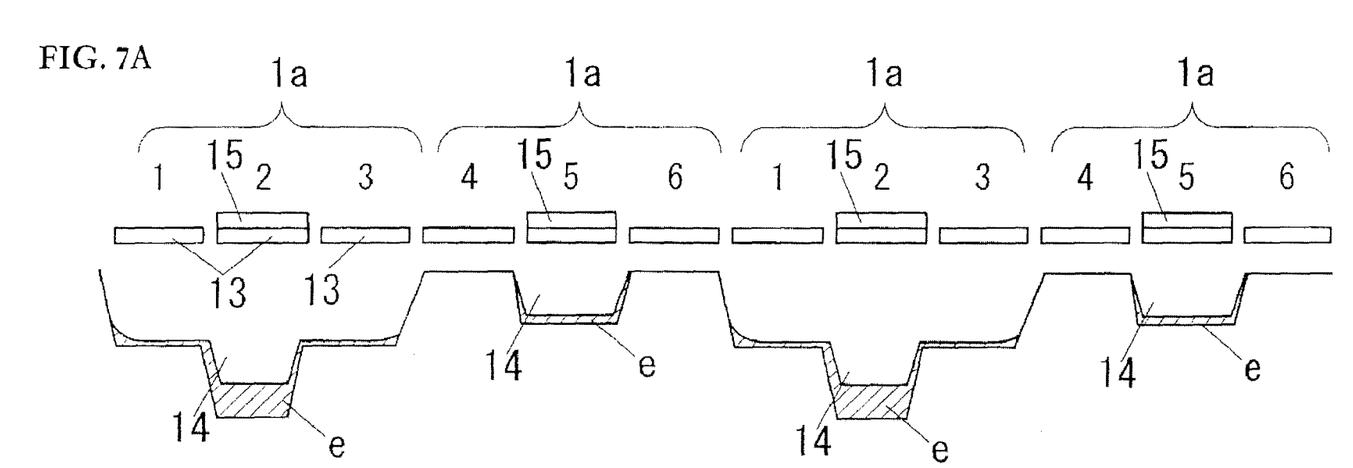
FIGS. 7A and 7B are schematic diagrams illustrating another example of potential wells formed in the light receiving device of the present invention.
Figure 7B:
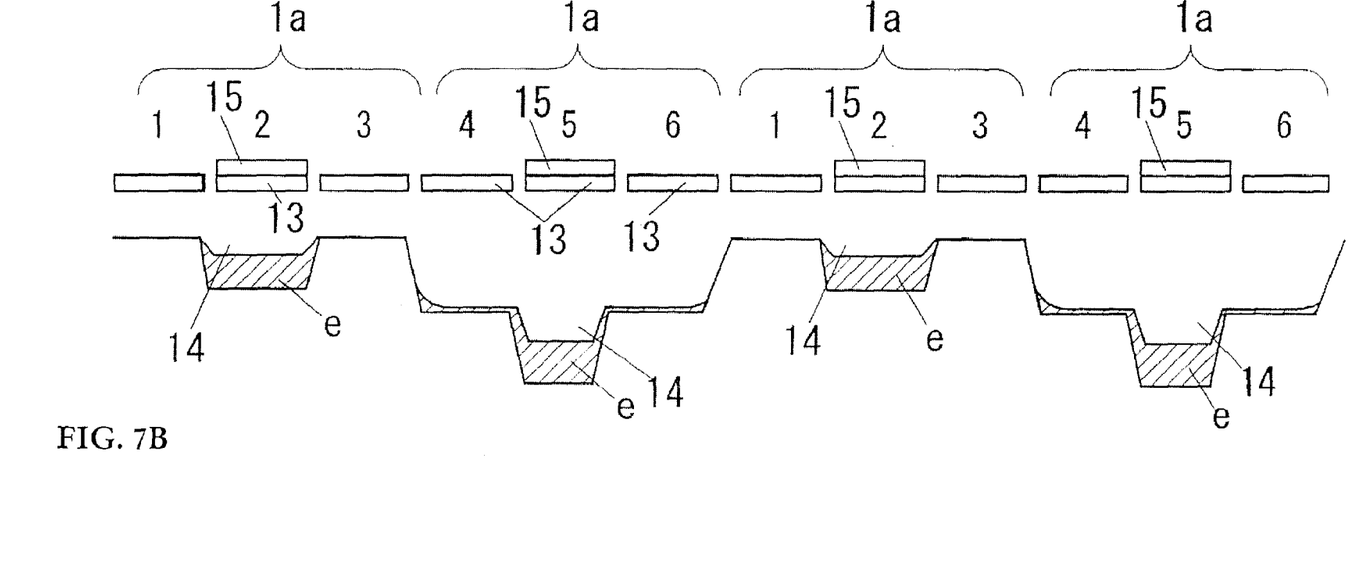

The present embodiment is, as shown in FIGS. 7A and 7B, substantially the same as the fourth embodiment except that a light shielding film 15 is formed on the center electrodes (2) and (5) of the three electrodes (1) to (3) and (4) to (6). That is, electric charges are not generated at a region of the photoelectric converter corresponding to the light-shielding film 15. Therefore, it is possible to remarkably reduce the probability that dispensable electric charges are mixed as the noise components in the potential well 14 having the small area within the charge holding period In addition, in this embodiment, when the control voltage is simultaneously applied to the three electrodes (1) to (3) or (4) to (6) to obtain the potential well having the large area, the control voltage applied to the center electrode (2) or (5) is higher than the control voltage applied to the side electrodes (1) and (3) or (4) and (6). In this case, the electric charges generated in the potential wells 14 corresponding to the electrodes (1), (3), (4) and (6) can smoothly flow in the potential wells having a larger depth corresponding to the center electrodes (2) and (5), and then be collected therein.

By the way, in the fourth embodiment shown in FIGS. 6A and 6B, a depth of the potential well 14 corresponding to the electrodes (1) to (3) or (4) to (6) within the charge generation period is constant. On the contrary, as shown in FIGS. 7A and 7B, the present embodiment is characterized in that the depth of the potential well 14,corresponding to the electrodes (1) and (3) or (4) and (6) within the charge generation period is smaller than the depth of the potential well 14 corresponding to the electrode (2) or (5) within the charge generation period.

In the fourth embodiment shown in FIGS. 6A and 6B, when the charge generation period and the charge holding period are switched every short time period of several nanoseconds or less, there is a possibility that part of the electric charges generated in regions of the photoelectric converter 1*a* corresponding to the electrodes (1) and (3) or (4) and (6) within the charge generation period can not flow in the potential well 14 corresponding to the electrode (2) or (5) within the charge holding period. In such a case, the electric charges may flow as noise components in a potential well formed in an adjacent photoelectric converter, in place of flowing in the potential well 14 corresponding to the electrode (2) or (5). This means that a ratio of the dispensable electric charges relative to the desired signal charges in the charge collection area 1*c* increases.

In this embodiment, a step-like potential well 14 is formed in the photoelectric converter corresponding to the electrodes (1) to (3) or (4) to (6), as shown in FIG. 7A. Therefore, as soon as the electric charges (electrons "e") are generated in regions of the photoelectric converter corresponding to the electrodes (1) and (3) or (4) and (6), they can efficiently flow in the potential well 14 having the larger depth formed in the region of the photoelectric converter corresponding to the electrode (2) or (5). Therefore, even when the charge generation period and the charge holding period are switched every short time period of several nanosecond or less, it is possible to reduce a probability of increasing the ratio of the dispensable electric charges as the noise components relative to the desired signal charges in each of the potential wells. The step-like potential well 14 can be formed irrespective of the presence or absence of the light shielding film 15. Other configuration and performance are similar to the third embodiment.

In the third and fifth embodiments, three electrodes 13 are formed every photoelectric converter 1*a*. However, four or more of the electrodes may be formed on each of the photoelectric converters. In the above embodiments, the control voltage was applied to only the center electrode or all of the three electrodes with respect to each of the photoelectric converters 1*a*. In other words, the control voltage was applied to the electrodes in two stages. However, when each of the photoelectric converters has the four or more of the electrodes, the control voltage may be applied to the electrodes in three stages or more.

In addition, the pair of local oscillator signals that are in the antiphase relationship with each other were used in the third embodiment. Alternatively, four local oscillator signals that are different in phase from each other by 90 degrees may be respectively provided to different four photoelectric converters. In this case, it is possible to simultaneously determine the four integrals (A0', A1', A2', A3').

By the way, in the third and fifth embodiments, the local oscillator signal was given to the electrode(s), as in the case of the second embodiment. Alternatively, signal charges corresponding to different phases in synchronization with the modulation signal may be given to the photoelectric converters. For example, when using a set of four photoelectric converters, signal charges corresponding to the intensities (A0, A1, A2, A3) of received light that have difference phases in synchronization with the period of the modulation signal are respectively collected in the charge collection areas corresponding to the four photoelectric converters 1*a*. In a brief, the signal charges of each of the phases are collected in the charge collection area of the corresponding photoelectric converter 1*a*.

Thus, since the signal charges collected in the plurality of charge collection areas 1*c* are output in a batch manner by the charge ejector 1*d*, it is possible to determine the phase difference "ψ" according to the signal charges corresponding to the intensities (A0, A1, A2, A3) of received light, as in the case of the first embodiment.

It is assumed that the image sensors 7 explained in the above embodiments have a two-dimensional arrangement of the light receiving devices. Alternatively, a one-dimensional arrangement of the light receiving devices may be used. In addition, only one photoelectric converter 1*a* may be used in the first and second embodiments.

Additionally, in the above embodiments, the analyzer 3 was designed to determine the distance between the apparatus and the object from the phase difference "ψ". Alternatively, the analyzer may be designed to determine only the phase difference "ψ" or determine another spatial information according to the integrals (A0', A1', A2', A3').

In the above embodiments, the size of the charge collection area formed in the photoelectric converter was controlled by changing the number of electrodes to which the control voltage is applied. Alternatively, the size of the charge collection area may be controlled by forming a distribution of impurity concentration in the semiconductor layer 11 that functions as the photoelectric converter such that the impurity concentration changes in a direction along the light receiving surface in accordance with distance from the electrode, and changing a magnitude of the control voltage applied to the electrode.

What is claimed is:

1. A light receiving element with controllable sensitivity comprising:
   a photoelectric converter for receiving a light at a light receiving surface and generating amounts of electric charges corresponding to an intensity of received light;
   at least one electrode formed on said photoelectric converter;
   a charge collection area induced in said photoelectric converter by applying a control voltage to said at least one electrode to collect at least part of the electric charges generated in said photoelectric converter;
   a charge ejector for outputting the electric charges from said charge collection area; and
   a sensitivity controller for controlling the control voltage such that the size of said charge collection area is switched between a charge generation period where said charge collection area has a large area and a charge holding period where said charge collection area has a small area.

2. The light receiving device as set forth in claim 1, wherein said at least one electrode are a plurality of electrodes, and said sensitivity controller controls the number of said electrodes, to which the control voltage is applied, to change the size of said charge collection area.

3. A spatial information detecting apparatus using intensity-modulated light comprising:
   a photoelectric converter having a light receiving surface for receiving a light provided from a space, into which a light intensity-modulated at a modulation frequency is being irradiated, and generating amounts of electric charges corresponding to an intensity of received light;
   at least one electrode formed on said photoelectric converter;
   a charge collection area, which is induced in said photoelectric converter when a control voltage is applied to said at least one electrode, for collecting at least part of the electric charges generated in said photoelectric converter;

a charge ejector for outputting the electric charges from said charge collection area;

a control circuit for controlling the control voltage such that the size of said charge collection area is switched between a charge generation period where said charge collection area has a large area and a charge holding period where said charge collection area has a small area; and an analyzer for determining spatial information from an output of said charge ejector.

4. The spatial information detecting apparatus as set forth in claim 3, wherein said control circuit controls the control voltage at a timing synchronized with a period of said modulation frequency.

5. The spatial information detecting apparatus as set forth in claim 3, wherein said control circuit controls the control voltage at a local oscillator frequency different from said modulation frequency, and said charge ejector outputs the electric charges from said charge collection area in synchronization with a beat signal having a frequency difference between said modulation frequency and said local oscillator frequency.

6. The spatial information detecting apparatus as set forth in claim 3 having a plurality of photoelectric converters, wherein said at least one electrode is formed on each of said photoelectric converters, and said control circuit applies control voltages having different phases from each other, which are synchronized with a period of said modulation frequency, to said electrodes on said photoelectric converters, and said charge ejector outputs, in a batch manner, the electric charges corresponding to the different phases from charge collection area induced in said photoelectric converters.

7. The spatial information detecting apparatus as set forth in claim 5 having a plurality of photoelectric converters, wherein said at least one electrode is formed on each of said photoelectric converters, and said control circuit applies control voltages having different phases from each other, which have a local oscillator frequency different from said modulation frequency, to said electrodes on said photoelectric converters, and said charge ejector outputs, in a batch manner, the electric charges corresponding to the different phases from charge collection area induced in said photoelectric converters.

8. The spatial information detecting apparatus as set forth in claim 3, wherein said photoelectric converter includes a doped semiconductor layer and an insulating layer on said semiconductor layer, said at least one electrode is formed on a general surface of said doped semiconductor layer through said insulating layer, and wherein said charge collection area is a potential well formed in said doped semiconductor layer by applying the control voltage to said at least one electrode.

9. The spatial information detecting apparatus as set forth in claim 8, wherein a plurality of electrodes are arranged as said at least one electrode on said doped semiconductor layer through said insulating layer, and said control circuit changes the number of said electrodes, to which the control voltage is applied, with passage of time.

10. The spatial information detecting apparatus as set forth in claim 9, wherein said control circuit changes a magnitude of the control voltage applied to said electrodes such that a first potential well is formed as said charge collection area in a charge holding period that the control voltage is applied to a required number of said electrodes, and a second potential well is formed to have a larger depth than said first potential well in a charge generation period that the number of said electrodes, to which the control voltage is applied, is larger than the case of said charge holding period.

11. The spatial information detecting apparatus as set forth in claim 10, wherein said control circuit controls magnitudes of the control voltages applied to said electrodes in said charge generation period such that said second potential well has a large depth at a region of said photoelectric converter corresponding to said electrodes, to which the control voltage is applied in said charge holding period, and a small depth at another regions of said photoelectric converter adjacent to said region having the large depth.

12. The spatial information detecting apparatus as set forth in claim 10, wherein said electrodes, to which the control voltage is applied to form said first potential well that is said charge collection area, has a light-shielding film.

13. The spatial information detecting apparatus as set forth in claim 3, wherein said analyzer includes determining a phase difference between the light irradiated into the space and the light received by said photoelectric converter.

14. The spatial information detecting apparatus as set forth in claim 13, wherein said analyzer includes converting said phase difference into distance information.

15. A method of controlling sensitivity of a light receiving element comprising:

a photoelectric converter for receiving a light at a light receiving surface and generating amounts of electric charges corresponding to an intensity of received light;

at least one electrode formed on said photoelectric converter;

a charge collection area induced in said photoelectric converter by applying a control voltage to said at least one electrode to collect at least part of the electric charges generated in said photoelectric converter; and a charge ejector for outputting the electric charges from said charge collection area, wherein said method is characterized by comprising the step of controlling the control voltage such that the size of said charge collection area is switched between a charge generation period where said charge collection area has a large area and a charge holding period where said charge collection area has a small area.

16. The spatial information detecting apparatus as set forth in claim 3, wherein said at least one electrode are a plurality of electrodes, and said control circuit controls the number of said electrodes, to which the control voltage is applied, to change the size of said charge collection area.

17. The method as set forth in claim 15, wherein said at least one electrode are a plurality of electrodes, and the size of said charge collection area is switched between the charge generation period and the charge holding period by controlling the number of said electrodes, to which the control voltage is applied.

* * * * *